(No Model.)
W. L. JANCEY & F. W. INGRAM.
STEAM TRAP.
No. 554,698. Patented Feb. 18, 1896.
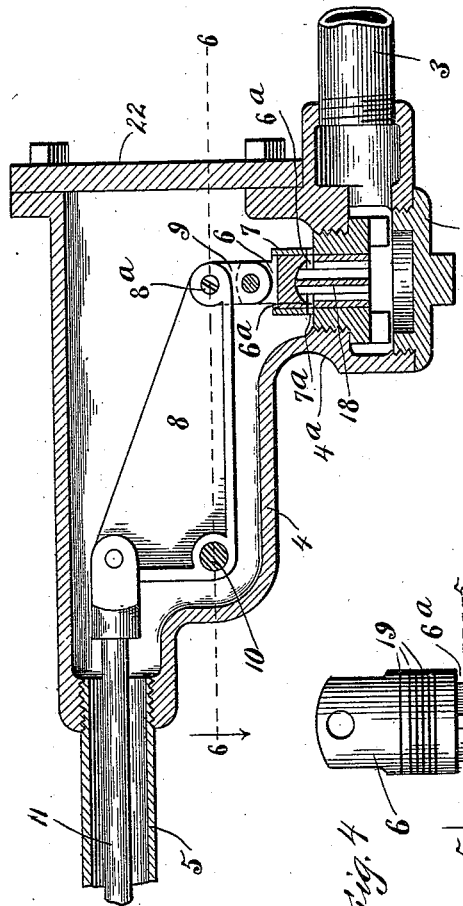
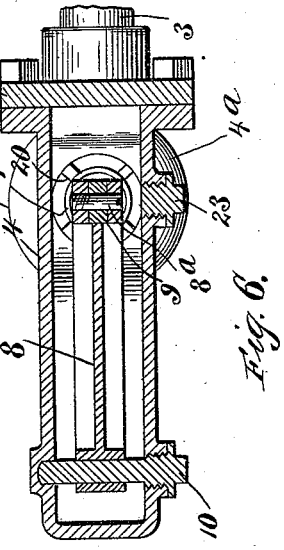
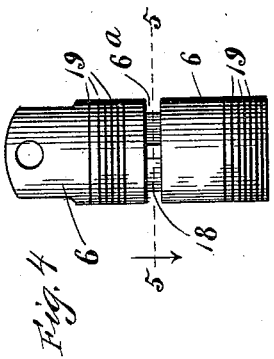
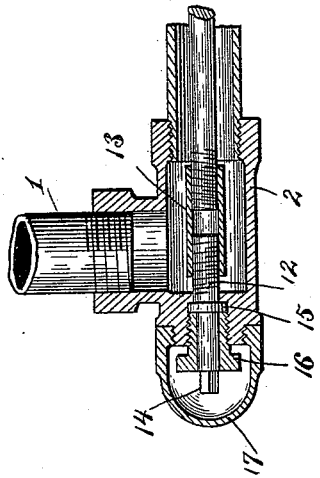
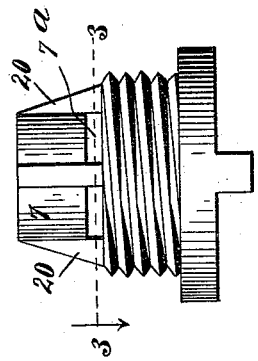
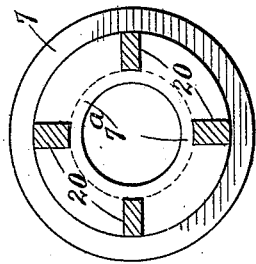
Witnesses:
W. C. Coolies
Jno. A. Christianson.
Inventors
William L. Jancey
Franklin W. Ingram
By Louis K. Gillesson
Atty.

UNITED STATES PATENT OFFICE.

WILLIAM L. JANCEY AND FRANKLIN W. INGRAM, OF CHICAGO, ILLINOIS.

STEAM-TRAP.

SPECIFICATION forming part of Letters Patent No. 554,698, dated February 18, 1896.

Application filed October 11, 1894. Serial No. 525,687. (No model.)

*To all whom it may concern:*

Be it known that we, WILLIAM L. JANCEY and FRANKLIN W. INGRAM, citizens of the United States, residing at Chicago, in the county of Cook and State of Illinois, have invented certain new and useful Improvements in Steam-Traps; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to steam-traps of the class in which thermostatic action is relied upon for controlling the valve.

The object of the invention is to apply to this class of devices a valve without limit to its range of movement, and in which the abrasion due to the action of the water is not brought upon the valve-seat, to secure a comparatively wide range of movement of the valve as a result of slight expansion, to provide means for accurately adjusting the device, and to inclose the entire action, thereby obviating the necessity for the use of a stuffing-box.

The invention consists of a tube of great expansibility and a rod of much less expansibility and inclosed within the tube, and the two being secured together at one end, a piston-valve, lever connection between the free end of the rod and the valve, means for shifting the position of the rod within the tube for the purpose of adjustment, and of such other parts and arrangement of parts as are hereinafter fully described.

In the accompanying drawings, Figure 1 is a longitudinal section of our regulating device. Figs. 2 and 3 are details of the valve-seat, Fig. 3 being taken on the line 3 3 of Fig. 2. Figs. 4 and 5 are details of the valve, Fig. 5 being taken on the line 5 5 of Fig. 4. Fig. 6 is a sectional view on the line 6 6 of Fig. 1.

The device is adapted for use in any situation in which steam-traps are employed, particularly in connection with steam-heating appliances, especially such as are used in cooking, &c., the trap being located in the waste or drain pipe and being intended to maintain a uniform temperature and to provide for the automatic discharge of water due to condensation.

The pipe 1 leads from the heater or system to be drained, the pipe 3 leading to the tank or other receptacle for the water discharged. At 2 is shown an L-shaped coupling, one of its arms being screwed onto the pipe 1, and an expansible tube 5, which will usually be of brass, is screwed into the other arm of the coupling. The tube 5 may be of any desired length, and to its farther end is attached a shell 4, having sufficient internal capacity for the accommodation of a bell-crank lever 8, fulcrumed at its angle to the shell by means of the pin 10. The valve 6 is in the form of a trunk-piston, chambered longitudinally from its outer end and having ports $6^a$ in its sides, and being seated within a bushing 7, secured by screw-threads within a lateral neck $4^a$ of the shell 4, and being prolonged into the chamber of the shell 4 beyond the neck $4^a$, into which it is screwed, and having ports $7^a$ in this prolonged portion which are adapted to register with the ports $6^a$. The lateral neck $4^a$, into which the bushing 7 is screwed, is prolonged beyond the bushing so as to provide a chamber from which the pipe 3 leads. The end of this lateral neck $4^a$ is open to admit of the introduction of the bushing 7, and a cap 21 is adapted to and is screwed into this opening.

The inner end of the valve 6 is connected to the longer arm of the bell-crank 8 by means of a link 9, the shorter arm of the bell-crank being pivoted to the end of a rod 11, located within the tube 5 and projecting into the shell 4, its opposite end being rigidly attached to the coupling 2.

The rod 11 is of a metal, preferably steel, of much less expansibility than that of which the tube 5 is formed, and the valve 6 is actuated by the variation in the length of the tube 5, whereby the position of the shell 4 is changed relatively to the end of the rod 11, and the bell-crank lever 8 is caused to turn upon its fulcrum 10.

The rod 11 is secured to the coupling 2 in the following manner: The heel of the coupling 2 is apertured in alignment with the center line of the tube 5. The spindle 12, having its inner end screw-threaded, is inserted into this aperture so as to project within the coupling 2, and is united with the rod 11 by a sleeve-coupling 13, screwed onto the end of each. The outer end of the spindle 12 is squared for the application of a wrench, and approximately midway of its length it is provided with an annular rib 15, which fits within a counterbore of the aperture in the heel of the coupling 2. This counterbore is screw-threaded, and a bushing 16 is set into it so as to bear upon the rib 15. The outer ends of the spindle 12 and of the bushing 16 are covered by a cap 17, screwed upon the heel of the coupling 2. The valve 6 is provided with internal radial ribs 18, meeting at the center. The ports 6ª are formed by cutting an annular channel through the shell of the valve with a lathe-tool, the ribs 18 holding the two ends of the valve together. The bushing 7 is reduced in its external diameter at its inner end, and that portion of it is provided with external radial ribs 20, and the ports 7ª are formed by cutting an annular channel through the walls of the bushing 7, the ribs 20 holding the two ends of the bushing together. The valve 6 is provided with a number of shallow grooves 19, which pack it against the escape of steam by becoming filled with water, any steam which may find its way into these grooves being quickly condensed, and the valve being made a sufficiently close fit within the bushing 7 to be water-tight. The outer end of the shell 4 is apertured for the introduction of the bell-crank 8 and rod 11 and the valve 6, and this aperture is closed by a cap 22.

In putting the device together the valve 6 and bell-crank 8 are not connected until both are in place, when they are united by means of a pin 8ª, set in the end of the bell-crank and passing through the link 9. For convenient insertion of this pin we form the shell 4 with an aperture in its side wall, which is closed by means of a plug 23. The wall of the shell 4 is also apertured for the introduction of the fulcrum-pin 10, and in order to secure the benefit of the full strength of this pin the opposite wall of the shell 4 is recessed to receive its inner end.

In devices of this kind which act upon the principle of the thermostat it is very desirable to avoid the use of a valve of the disk or plug form, which is closed by being forced tightly against the seat, for the reason that it is impossible to determine to exactly what extent the contraction of the metal relied upon for seating the valve will proceed, and consequently the valve may be so firmly forced to its seat as to injure the parts or as to become wedged. It is common in using such form of valve to provide a seat of soft metal, which will yield in case of undue pressure; but in that event it becomes necessary to frequently replace the valve-seat. There is apt to be an accumulation of sediment within the drain-pipes, and in order to avoid clogging of the valve it is important to secure as great an area in the ports as possible. The expansion relied upon to shift the valve is necessarily very slight, and we therefor use the bell-crank lever for multiplying the movement and give the valve sufficient throw to open the ports for the free discharge of the water.

The peculiar means for forming the ports in the valve and in the bushing 7 is resorted to for the purpose of convenience of manufacture, accuracy, and in order to give the greatest possible area.

The inner end of the valve 6 being solid and exposed to the pressure within the shell 4, the valve is always under strain away from the rod 11, thereby taking up any lost motion there may be in the joints.

The screw-threaded attachment of the sleeve 13 to the rod 11 is made tighter than that of the sleeve 13 to the spindle 12, so that when the latter is turned it is certain to turn in the sleeve. The trap may be adjusted so that the valve will open at any desired temperature by removing the cap 17 and applying a wrench to the outer end 14 of the spindle 12, and this adjustment may be made permanent by screwing down the bushing 16 hard upon the rib 15. While making this adjustment there will be a slight, though immaterial, escape of steam around the spindle; but a tight joint is formed by replacing the cap 17.

We claim as our invention—

1. In a steam-trap the combination with the coupling 2, the tube 5, the rod 11, differing from the tube in expansibility, the spindle 12, journaled in the heel of the coupling and in longitudinally-adjustable engagement with the rod, the bell-crank lever 8, having unequal arms, the piston-valve 6, the shell 4, pivotal attachment between the shell and the bell-crank at its angle, pivotal attachment between the rod 11, and the short arm of the bell-crank, and link connection between the long arm of the bell-crank and the valve.

2. In a steam-trap the combination with a piston-valve longitudinally recessed and having an annular port and internal ribs for connecting the ends, of a tubular seat for the valve and having an annular port and external ribs crossing such port for uniting its ends, and spaced apart to allow the free passage of liquid to or from the port and thermostatic means for actuating the valve.

3. In a steam-trap the combination with an expansible tube, 5, of a coupling, 2, attached to the end of the tube, a shell, 4, attached to the opposite end of the tube and having an apertured neck, 4ª, a centrally-apertured bushing 7, adapted to the aperture of the neck, 4ª, and having an annular port and ribs spanning the port, a piston-valve, 6, adapted to reciprocate within the aperture of the bushing and being apertured from one end and provided with an annular port and internal ribs spanning the port, a rod, 11, of less expansibility than the tube, 5, and extending therethrough and being secured to the coupling, 2, a bell-crank pivoted within the shell, 4, the short arm of the bell-crank being in pivotal connection with the rod, 11, and its long arm being in linked connection with the valve 6, substantially as described and for the purpose specified.

4. In a steam-trap the combination with an expansible tube, 5, an elbow-coupling, 2, secured to one end of the tube, and having its heel apertured in alignment with the tube and counterbored, a rod, 11, within and of less expansibility than the tube, a spindle, 12, in screw-threaded attachment to the rod and extending through the aperture of the coupling and having an annular rib adapted to rest within its counterbore, a bushing 16, constructed to screw within the counterbore and lock the spindle against rotation by bearing upon its rib, a cap 17, for covering the end of the spindle and the bushing, a shell, 4, attached to the end of the tube remote from the coupling, 2, and having an apertured neck, $4^a$, centrally-apertured bushing adapted to the aperture of the neck and having an annular port and ribs 20, spanning the port, a piston-valve, 6, seated within the bushing and being apertured from one end and having an annular port and internal ribs spanning the port, a bell-crank pivoted within the shell 4, pivotal connection between the rod 11, and the short arm of the bell-crank, link connection between the long arm of the bell-crank and the valve, 6, substantially as described and for the purpose specified.

In testimony whereof we affix our signatures in presence of two witnesses.

WILLIAM L. JANCEY.
FRANKLIN W. INGRAM.

Witnesses:
E. E. BARTHOLOMEW,
LOUIS K. GILLSON.